No. 822,977. PATENTED JUNE 12, 1906.
E. A. NOLL.
CHUCK.
APPLICATION FILED AUG. 31, 1904.
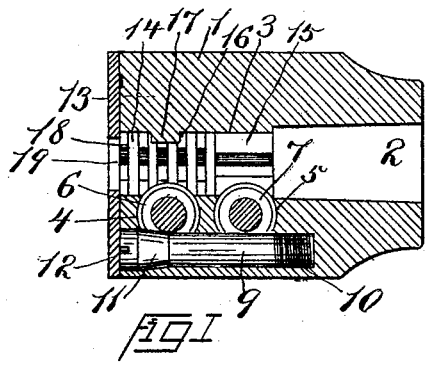
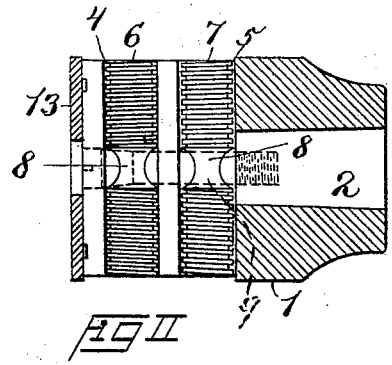
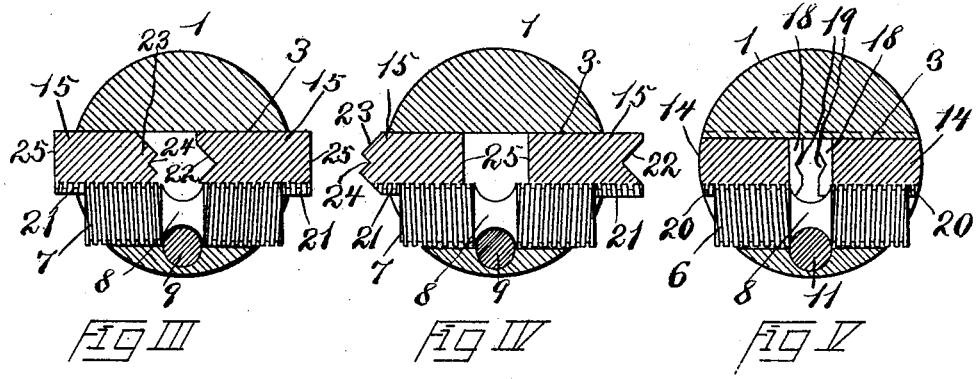
Witnesses
J. G. Heaton
C. E. Johnson.
E. A. Noll,
Inventor,
by Wm. Lecher
Attorney.

UNITED STATES PATENT OFFICE.

EDWARD A. NOLL, OF CLEVELAND, OHIO, ASSIGNOR TO THE NATIONAL TOOL COMPANY, OF CLEVELAND, OHIO, A CORPORATION OF OHIO.

CHUCK.

No. 822,977.　　　　　Specification of Letters Patent.　　　　　Patented June 12, 1906.

Application filed August 31, 1904. Serial No. 222,847.

*To all whom it may concern:*

Be it known that I, EDWARD A. NOLL, a citizen of the United States, and a resident of Cleveland, county of Cuyahoga, and State of Ohio, have invented certain new and useful Improvements in Chucks, of which the following is a specification, the principle of the invention being herein explained and the best mode in which I have contemplated applying that principle so as to distinguish it from other inventions.

The annexed drawings and the following description set forth in detail one mechanical form embodying the invention, such detail construction being but one of the various mechanical forms in which the principle of the invention may be used.

In said annexed drawings, Figure I represents an axial section of my improved chuck; Fig. II, an axial section of the chuck taken at right angles to the former figure; Fig. III, a transverse section taken through the jaws which engage the square or nib of the tool; Fig. IV, a transverse section through said jaws and showing them reversed for engaging a flat nib of a tool, and Fig. V a transverse section through the jaws engaging the round portion of the tool.

The chuck-body 1 is of the usual cylindrical form and is shown as formed with an axial socket 2 for the purpose of fitting upon the spindle of a drill-press. When the chuck is designed for attachment in another form of machine the chuck-body is provided or formed with other suitable means of attachment. The chuck-body is formed with a transverse slot 3 and with two transverse bores 4 and 5, which are intersected by the transverse slot. Two screws 6 and 7 and having right and left hand screw-threads fit in the bores and each has a circumferential groove 8 at the middle, separating the screw-threads. The circumferential grooves are cylindrical in cross-section. A pin 9 fits in a longitudinal bore in the chuck which intersects the transverse bores at their middles, so that the pin may engage the circumferential grooves in the screws and keep the same against lateral displacement. The inner end of this pin has a screw-thread 10 for securing it in the bore, and the diameter of the cylindrical portion of the pin is less than the diameter of the circumferential groove in the inner screw 7, so that said screw has slight longitudinal movement in its bore. That portion of the pin which engages the circumferential groove of the outer screw is tapering, as indicated at 11, so that this tapering portion may completely engage the circumferential groove and prevent all lateral movement of the screw and take up wear by screwing the pin into its bore. The head of the pin has the usual nick for turning it by means of a screw-driver, and the head of the pin is covered by means of a face-plate 13, secured upon the face of the chuck.

Two pairs of jaws 14 and 15 slide in the transverse slot in the chuck-body. The outer jaws 14 have each a groove 16, which slides upon a spline 17 in the side of the slot, being guided by this groove and spline. These outer jaws are preferably longer than the inner jaws 15. The opposed faces of the outer jaws have a number of tongues 18, which may interlock when the jaws are drawn completely together, and the edges of said tongues have obtuse notches 19, so that the cylindrical portion of the tool may be engaged and clamped by said notches when the jaws are drawn together upon the shank of the tool. One side of each jaw has a screw-threaded groove 20, which is engaged by the right and left hand screw-thread of the adjusting-screw, so that the jaws may be moved in and out by rotating the screw. The inner jaws 15 are similar to the outer jaws, excepting that they have no guide-groove and are shorter than the outer pair of jaws. This inner pair of jaws has screw-threaded grooves 21, similar to the outer jaws, which grooves engage the right and left hand screw-thread of the inner adjusting-screw. The opposed faces of these jaws are formed, one with a rectangular notch 22 and the other with a rectangular projection 23, having a rectangular notch 24 in its end. The opposed notches will engage the square at the end of the tool-shank.

When a tool having a flat nib at the end of the shank is used in the chuck, the jaws are drawn out and reversed, and the ends or faces 25, which normally are the outer ends or faces and which are flat, will thus be the inner and clamping faces of the jaws and may engage the flat nib of a drill or similar tool held in the chuck.

By means of this chuck having two pairs of jaws respectively holding the round shank and the square or flat end of the tool and having separate adjustment a tap or drill will be perfectly held and supported with absolutely no possibility of turning or twisting in the chuck. The slight lateral play which the adjusting-screw for the inner pair of jaws has admits of said jaws adjusting themselves to any possible eccentricity of the square or flat nib of the tool. If the outer adjusting-screw becomes loose from wear, such wear may be taken up by screwing the retaining-pin farther into its bore, and thus draw the tapering portion of the pin farther and tighter against the circumferential groove of the adjusting-screw. The reversibility of the inner jaws admits of the same chuck being used for securing tools having square ends or flat nibs upon their shanks.

Other modes of applying the principle of my invention may be employed for the mode herein explained. Change may therefore be made as regards the mechanism thus disclosed, provided the principles of construction set forth respectively in the following claims are employed.

I therefore particularly point out and distinctly claim as my invention—

1. The combination of a chuck-body, two sets of jaws sliding in the body, one to the inside of the other, means for separately actuating each set of jaws, and the actuating means for one set of jaws having slight play to allow the jaws to adapt themselves to eccentricities in the tool clamped by the jaws.

2. The combination of a chuck-body formed with a transverse slot and with two transverse bores intersected by the slot, two pairs of jaws sliding in the slot and having clamping-faces shaped to engage different portions of the tool-shank and formed with right and left hand screw-threaded grooves in their sides registering with the open sides of the transverse bores, two right and left hand screws in the transverse bores and engaging the grooves in the jaws and formed with circumferential grooves at their middles, and a retaining-pin in the chuck-body and engaging the circumferential grooves of the screws and of such size as to snugly fit into the groove of one screw and to loosely fit into the groove of the other screw.

3. The combination of a chuck-body formed with a transverse slot and with two transverse bores intersected by the slot, two pairs of jaws sliding in the slot and formed with right and left hand screw-threaded grooves in their sides registering with the open sides of the transverse bores, two right and left hand screws in the transverse bores and engaging in the grooves in the jaws and formed with circumferential grooves at their middles, and a retaining-pin in the chuck-body and having a screw-thread for adjustably securing it in the same and engaging the circumferential groove of the screws and having that portion which engages the groove of the inner screw slightly smaller than said groove and having that portion which engages the groove of the outer screw tapering.

4. In a chuck, the combination with a jaw-adjusting screw formed with a circumferential groove, of a longitudinally-adjustable retaining-pin engaging the circumferential groove and having its engaging portion oblique to take up wear of the engaging surfaces by longitudinal adjustment of the pin.

In testimony that I claim the foregoing to be my invention I have hereunto set my hand this 22d day of August, A. D. 1904.

EDWARD A. NOLL.

Witnesses:
   WM. SECHER,
   CORA GALLAGHER.